United States Patent [19]

Klein

[11] 3,775,563

[45] Nov. 27, 1973

[54] CIRCUIT ARRANGEMENT FOR A TELEPHONE EXCHANGE SYSTEM WITH CONFERENCE EQUIPMENT

[75] Inventor: Peter Klein, Gauting, Germany

[73] Assignee: Siemens Aktiengesellschaft, Berlin and Munich, Germany

[22] Filed: Jan. 31, 1972

[21] Appl. No.: 222,196

[30] Foreign Application Priority Data

Jan. 29, 1971 Germany.................. P 21 04 337.8
Jan. 29, 1971 Germany.................. P 21 04 263.7

[52] U.S. Cl........................... 179/2 TV, 179/1 CN
[51] Int. Cl........................................... H04m 3/56
[58] Field of Search...................... 179/2 TV, 1 CN; 178/6.8, DIG. 1, DIG. 3, DIG. 13

[56] References Cited

UNITED STATES PATENTS

| | | | |
|---|---|---|---|
| 3,636,265 | 1/1972 | Kikuchi et al. | 179/2 TV |
| 3,601,530 | 8/1971 | Edson | 179/2 TV |
| 3,665,311 | 5/1972 | Gargini | 178/DIG. 13 |
| 3,519,744 | 7/1970 | Dorros | 179/2 TV |
| 3,180,931 | 4/1965 | Morchand | 178/6.8 |
| 3,179,745 | 4/1965 | Stone | 178/6.8 |

FOREIGN PATENTS OR APPLICATIONS

| | | | |
|---|---|---|---|
| 1,173,918 | 12/1966 | Great Britain | 179/2 TV |

*Primary Examiner*—Kathleen H. Claffy
*Assistant Examiner*—Thomas D'Amico
*Attorney*—William E. Schuyler, Jr. et al.

[57] ABSTRACT

Apparatus is described for telephone exchange installations having a video signal handling capability for completing a conference connection thereover. Each subscriber station is equipped with a video device consisting of a television camera and receiver. The video devices can be connected over a video conference transmission network having a single picture line, connected in common to all video devices, and a combined picture line capable of transmitting a combined picture of all conference participants. All video devices can have their receivers connected to the combined picture line and their cameras and receivers to the common single picture line. These connections are made over switch elements at the subscriber stations which are controlled by voice signal responsive devices. Means are provided to insure that only one voice signal responsive device can operate at any given time.

9 Claims, 7 Drawing Figures

CIRCUIT ARRANGEMENT FOR A TELEPHONE EXCHANGE SYSTEM WITH CONFERENCE EQUIPMENT

BACKGROUND OF THE INVENTION

The invention relates to apparatus for a telephone exchange system with conference signal receivers which can be engaged from subscriber stations to form a conference connection. The system also includes a conference transmission network in which video devices consisting of a television camera and a television receiver for video reproduction at the subscriber stations are attached to the participant stations which are to take part in the conference connection.

For some time, circuit arrangements of various types for telephone exchange systems have been known, which have the facility for connecting auditorially specific or arbitrary subscriber stations of the exchange system into a conference connection. With a larger number of conference participants connected with each other only auditorially, however, the course of the conference becomes unclear, because the conference participant who is speaking can be recognized by his voice only. Just recently, circuit arrangements have become known with which the subscriber stations of a telephone exchange system, which are equipped with video-telephones, can be connected together into a conference connection in video as well as in audio.

In a circuit arrangement already proposed the video devices consisting of a television camera and a television receiver are attached to the individual telephones and are connected with each other for the establishment of a conference connection over common lines, like ordinary telephones.

Whereas, it suffices for an audio conference connection to connect the telephones of all conference participants to a common conference line; for a conference hook-up in picture and sound two further common video lines are necessary. The first of these is connected with the television receivers of all subscriber stations participating in the conference connection for the entire duration of the conference, and the second line can be engaged singly by the television cameras of all subscriber stations participating in the conference, as necessary. These two common video lines are connected with each other over a connecting device transmitting the picture signals, e.g., over an amplifier. Whereas, at the start of a conference, the television receivers of all subscriber stations participating in the conference are connected to the first video line; only the television camera of the subscriber station which convenes the conference is connected to the second video line, so that only the picture of the convener appears on the television receivers of all subscriber stations. In the further course of the conference connection, then, every other subscriber station can switch to the second video line by pressing a key, so that the participant speaking at the moment is visible on the television receivers of all other conference participants.

A video telephone conference circuit has become known from the German Patent No. 1,914,874, which contains a series of subscriber apparatus, which are built to send and to receive audio as well as video signals. The patented apparatus provides means by which the individual subscriber apparatus are connected in audio and in video in the course of a conference in a novel manner. The single picture transmitted in each case is transmitted in dependence upon the speech signals of the speaking participant and changes each time the discourse is taken over by another conference participant, the picture of a single privileged participant being transmitted although several participants are speaking simultaneously.

An object of the invention is to provide means for simplifying the construction and operation of apparatus for completing conference connections in telecommunication exchange systems in which both audio and video signals are involved.

An additional object is to provide means for improving conference connections in telecommunications exchange systems over which audio and video signals are transmitted such that it will be less difficult for a participant to learn the identities of other participants in a conference.

SUMMARY OF THE INVENTION

The aforementioned and other objects are achieved according to the invention in that the video devices of the subscriber stations participating in the conference connection can be connected together over a video conference transmission network having a single-picture line attached in common to all video devices and a combined picture line transmitting a combined picture composed of individual pictures of the participants in a manner appropriate to the course of the conference. All video devices can have their receivers connected to the combined picture line, and they can have their cameras and receivers connected to the common single picture line, over individual and common switching means controlled by devices responding to voice signals in the conference signal receivers.

The advantages achieved with the arrangement according to the invention lie in the fact that with a larger number of conference participants each participant has the possibility, by means of the collective picture available to him to obtain at any time an overview of the instantaneous make-up of the conference. Whereas, normally, the picture of the participant, who is speaking, appears automatically on the television receivers of all stations participating in the conference connection; the combined picture is transmitted in the pauses in speech, as well as upon exit of a participant from the conference, over a special common combined picture line to the television receivers of all stations participating in the conference at the time. Thus, the participant content of the conference connection is made much clearer to all concerned. The conference-related connection of all video devices to the common video lines at the cameras and receivers is voice-controlled and proceeds through voice receivers lying in the voice paths of the individual conference participants or voice paths which are to be switched in.

A further advantage of the invention lies in the fact that existing exchanges, even those having no voice conference equipment, can readily be converted to allow audio-video conferences using this invention.

In accordance with a further aspect of the invention, for the combining of the individual single pictures taken by the television cameras of the subscriber stations participating in the conference connection into a combined picture to be transmitted on the combined picture line, there is provided a combined picture emitter which contains a picture combining device. The latter is constituted by a combined picture camera and monitors connected to monitor lines transmitting the individual single pictures, and which can be engaged individually. A distribution switching network is inserted into these monitor lines, and a control device is provided for selecting coupling points in the distribution switching network in order to put together the proper combined picture. This selection depends on the number of occupied monitor lines. The control device regulates the partition of the combined picture to be forwarded by the combined picture camera as well as the sizes of the single pictures reproduced in this combined picture.

A combined picture emitter constructed accordingly guarantees an optimal use of the collective picture surface by the single pictures. In conference connections between subscriber stations equipped with videotelephones it is highly desirable to prevent an unpermitted entrance by an unauthorized participant into the conference connection. This can ordinarily be achieved technically and operationally only at some expense, but such a case can be monitored simply with the aid of the combined picture apparatus of this invention.

In accordance with a further feature of the invention, an individual single picture line is permanently assigned to the individual subscriber stations participating in the conference, for the duration of their participation, in the picture conference transmission network. This line can be connected at the camera of each video device over individual switching means which can be voice controlled. To these single-picture lines all video devices of authorized subscriber stations can be connected at their receivers over special station keys, at any time. This enables conference participants at subscriber stations which are equipped with such special station keys to request the picture of every participant desired at any time along with the combined picture.

The composition of the combined picture from the single-pictures of the subscriber stations participating in the conference connection proceeds, according to a further extension of the invention, not only in dependence on the number of conference participants, but also in dependence on the special characteristics assigned permanently to the individual subscriber stations. Thus, certain locations on the combined picture can be permanently assigned to privileged conference participants. For example, the conference leader could be portrayed in the center of the combined picture, and the other conference participants can be portrayed at arbitrary or predetermined points around the conference leader.

In accordance with a further aspect of the invention, upon exit of any conference participant from the conference connection, in consequence of the temporary change in the switching state of the common switching means connecting the video devices of all conference participants at their receivers to the common video lines of the video conference transmission network, the video devices of all subscriber stations remaining in the conference connection are necessarily connected at their receivers with the collective picture line for a short time. This is insured by a further common switching means being activated by means of a current impulse triggered by a switching means which also takes over the coupling of the video device of the respective subscriber station to the video conference transmission network. All participants remaining in the conference receive thereby, with the exit of any participant from the conference connection, a combined picture with which they can have an overview of the conference participants still present.

The invention further contemplates the use of a television camera which can be connected to the combined picture line in the video conference transmission network by activating a switch. The camera is assigned to an exchange location with access to the voice conference transmission network which can be connected to an existing conference connection for the purpose of transmission of a reference picture to the video devices of all conference participants. Through this key, in addition, switching means for switching off the combined picture from the combined picture line and for connection control at the receivers of the video devices of all conference participants to the combined picture line can be controlled. The operator at the exchange can, therefore, be switched in independently of the momentary state of the conference connection and in urgent cases can give all conference participants a reference picture over the common combined picture line. The switching in proceeds preeminently at all times, i.e. upon activation of the switching-in key by the operator, the video devices of all subscriber stations participating in the conference connection at the times are connected automatically with the combined picture line at their receivers.

BRIEF DESCRIPTION OF THE DRAWINGS

The principles of this invention will be more readily understood by reference to a description, given hereinbelow, of a preferred embodiment constructed according to these principles in conjunction with the drawings in which.

Figure 1:
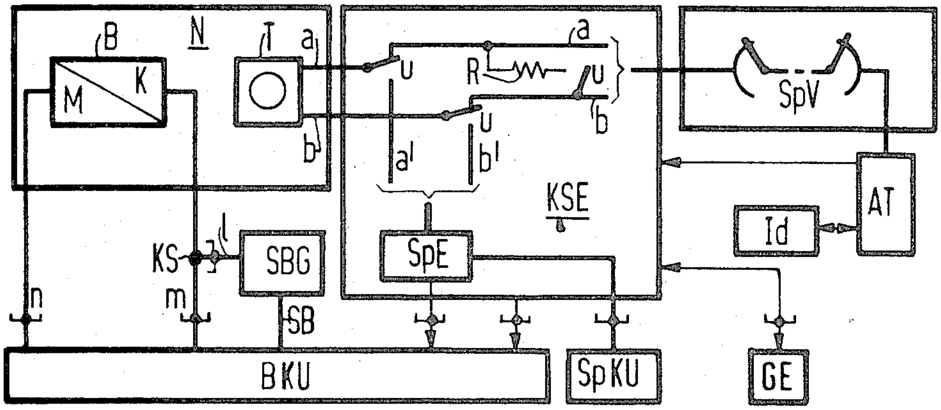
FIG. 1 is a general schematic diagram of the conference apparatus used in conjunction with a telephone exchange.

DETAILED DESCRIPTION OF THE DRAWINGS:

According to FIG. 1, every subscriber station N is equipped as to have the possibility of participation in a video-audio conference connection with a telephone T and a video device B consisting of a television camera K and a television receiver M. To each video-telephone subscriber station with conference capability, called television conference subscriber station N, there can be attached individually a conference signal receiver KSE, which switches the audio cables *a*, *b* of subscriber station N, which normally lead into the telephone exchange device S*p*V, over to the voice conference transmission network S*p*KU upon its entrance into a conference hook up. This is accomplished by means of a change-over relay U (U1, U2, U3) shown in FIG. 4, over the audio cables *a'*, *b'*. This conference signal receiver serves, in addition, to receive and evaluate the voice and loop signals of the television conference subscriber station N. Upon entrance into the conference connection, the conference signal receiver KSE takes over further the feeding of the subscriber station N and, after change-over of the audio cables *a*, *b* to the voice conference transmission network S*p*KU, controls the connection of video cables *m*, *n* of the television conference subscriber station N to the video conference transmission network BKU.

The through-switching of the video cables *m*, *n* of the individual television conference subscriber stations participating in the conference connection proceeds in the video conference transmission network BKU. The signals for the through-switching are emitted by a voice receiver S*p*E which is placed in the conference signal receiver occupied by the television conference subscriber station. Entry into the television conference connection proceeds for each subscriber station N over the telephone exchange S*p*V upon dialing of an automatic subscriber station AT. The latter identifies the dialing subscriber station N over an identification device I*d*, and when there is a positive identification result, emits a signal to the conference signal receiver KSE which is connected to the calling subscriber station. On the basis of the latter signal the control processes for change-over of the audio cables *a*, *b* to the voice conference transmission network S*p*KU and for connection of the video cables *m*, *n* to the video conference transmission network BKU, are initiated. One of the video cables, namely the camera line *m*, can be connected to combined picture emitter SBG, which is described further below, over the coupling point KS.

With a television conference connection, the video signals must be directed to the individual subscriber stations along with the voice signals. Normally, in this situation the picture of the conference participant who is speaking is transmitted to the television receivers of all subscriber stations participating in the conference connection. However, in addition, it is desirable, especially with a larger number of conference participants to give each participant the possibility of portraying on his receiver a picture of the momentary composition of the conference participants. This is made possible by the invention through the presence of a combined picture line, on which a combined picture composed of the single-pictures of all conference participants is available to each participant for the entire duration of the conference.

Figure 2:
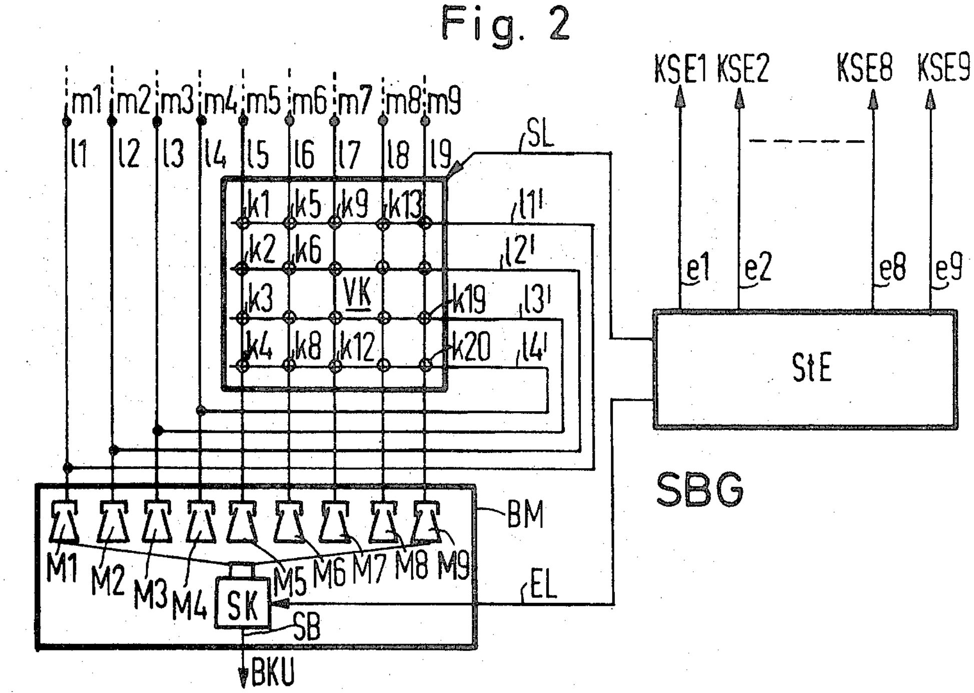
FIG. 2 is a schematic diagram of a combined picture emitter used in the FIG. 1 embodiment.

The combined picture emitter SBG used herefor comprises according to FIG. 2, of a picture combining device BM, a distribution switching network VK and a control device S*t*E. The picture combining device comprises in a simple manner a number of single picture monitors M1 to M9 corresponding to the highest possible number of conference participants, which monitors can be connected permanently with the camera lines *m*1 to *m*9, respectively, of the individual television conference subscriber stations, over the monitor lines *l*1 to *l*9. The common device GE in FIG. 1 provides for the fact that at any one time not more than a prescribed number of television conference subscriber stations (in the example 9) can participate in a conference connection. The combined picture signal can be taken from the combined picture camera SK, which is placed in front of the single picture monitors, arranged spatially as in FIG. 3*a*, and can be transmitted over the combined picture line SB to video conference transmission network BKU.

Figure 3A:
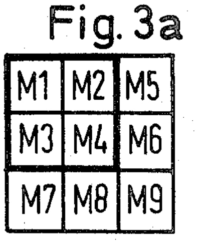
FIGS. 3 *a–c* are exemplary diagrams of the spatial relationships of the various individual pictures in the combined pictures issuing from the combined picture emitter of FIG. 2.

The manner of construction of this picture combining device BM yields the advantage that along with the saving on picture and line memories, no synchronization of the camera signals among each other is necessary. Normally, the locations M1 to M9 of the combined picture, according to FIG. 3*a*, are assigned to the subscriber stations participating in the conference connection at the moment. While the respective single pictures are to be seen on the collective picture at the places assigned to the subscriber stations participating in a television conference connection at the moment, the combined picture remains dark at the places belonging to the unengaged monitors.

Further, FIG. 2 shows a distribution switching network VK inserted in the monitor lines 15 to 19 and a control device S*t*E, which can initiate switching functions in the distribution switching network VK over the control line SL. Further, control device S*t*E can influence the type of composition of the combined picture emitted by the combined picture camera SK over adjustment line EL and the size of the single pictures reproduced therein, depending on the number of occupied monitor lines.

The control device S*t*E is connected with the individual conference signal receivers KSE1 to KSE9, which are to be assigned to the subscriber stations entering the conference connection, respectively, over nine input lines *e*1 to *e*9. From these receivers occupation signals are directed to the control device over these input lines. These occupation signals are evaluated in the control device and are used for the adjustment of the combined picture described in the following, especially for the case that only up to four conference subscriber stations are participating in a conference connection.

The control device S*t*E for the controlling of the distribution switching network VK and for the adjustment of the combined picture camera SK provides that the single picture size on the combined picture in one-ninth of the total picture size of the combined picture, when there are five to nine conference participants and is one-fourth of the total picture size of the combined picture when there are three or four conference participants. The control device S*t*E recognizes, by the occupation signals received from the individual conference receivers, whether the monitor lines 11 to 19 leading to the single-picture monitors are occupied by camera lines *m*1 to *m*9. For the case that the number of conference participants is not greater than 4, the monitor lines 15 to 19 can be switched over to as yet free single picture monitors M1 to M4 over the lines 11′ to 14′, by means of the distribution switching network VK.

Figure 3B:
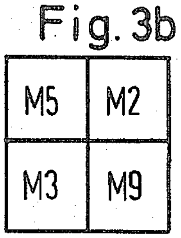
Figure 3C:
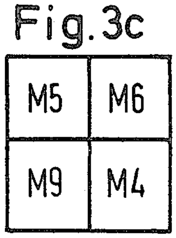

For example, if the monitor lines 2, 3, 5 and 9 have been engaged by four subscriber stations desirous of a conference, over their camera lines, and no further occupation signals of other subscriber stations are in the control device StE, then the participants at the subscriber stations connected with the monitor lines 12 and 13 appear on the single picture monitors M2 and M3 or at the locations M2 and M3 of the combined picture according to FIG. 3*a*. The camera signals on the monitor lines 15 and 19 are diverted to the single picture monitors M1 and M4 by means of the coupling points *k*1 and *k*20 of the distribution switching network VK and the lines 11′ and 14′. In addition, in this case the combined picture camera SK is regulated by the control device over the adjustment line EL with respect to position and size of the single-pictures sent by the conference subscriber stations, such that the single pictures of the participant connected to the monitor lines 12, 13, 15 and 19 are arranged on the combined picture according to FIG. 3*b*. Upon entry of further conference subscriber stations, e.g., with occupation of further monitor lines 14 and 16, the recoupling of monitor lines 15 and 19 to the single picture monitors M1 and M4 is made retroactive, and the combined picture camera SK is again set such that the individual single pictures on the monitor lines 12, 13, 14, 15, 16 and 19 appear at the locations M2, M3, M4, M5, M6 and M9, according to FIG. 3*a*. The single picture locations assigned to monitors M1, M7 and M8 remain dark in the combined picture. If in the course of the conference the subscriber stations connected over the monitor lines 12 and 13 exit from the conference connection, then there results a combined picture according to FIG. 3*c* after recoupling of the monitor lines 15, 16 and 19 by means of the coupling points *k*1, *k*6 and *k*19 over the lines 11', 12' and 13' to the single picture monitors M1, M2 and M3, as well as after resetting the combined picture camera.

The control device StE combines, therefore, the single pictures into a combined picture with the help of the distribution switching network VK, depending on the number of subscriber stations participating in the conference connection. Further, it regulates position and size of the single pictures on the combined picture over the combined picture deflecting component.

Figure 4:
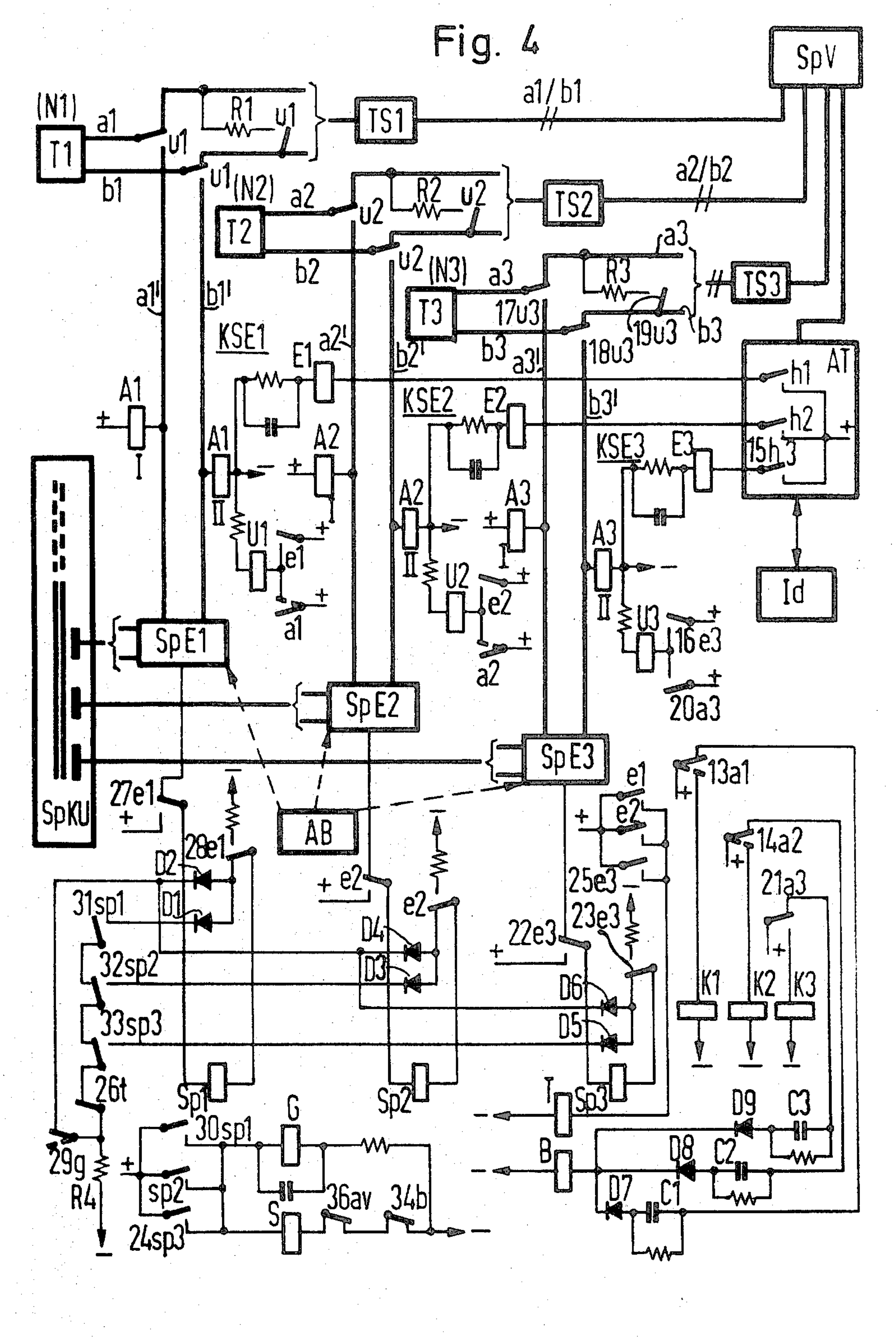
FIG. 4 is a more detailed schematic diagram of portions of the FIG. 1 embodiment and FIG. 5 is a more detailed schematic diagram of video conference transmission network portion of the FIG. 1 embodiment.
Figure 5:
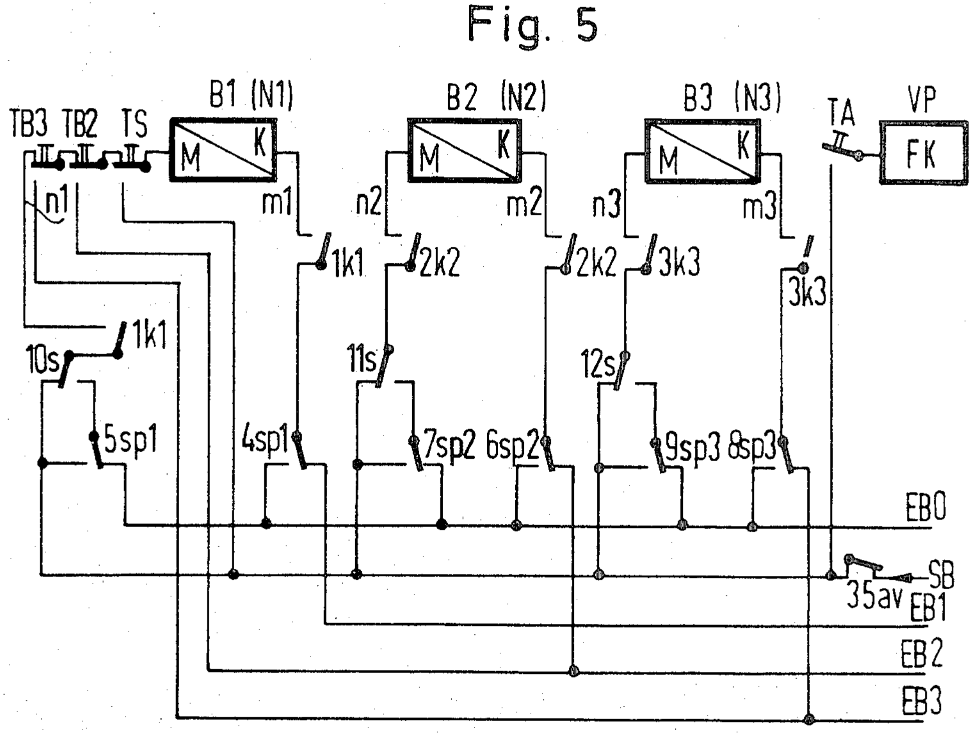

With the aid of FIGS. 4 and 5, the construction and operation of a television conference connection between 3 conference subscriber stations N1, N2 and N3 is now described in greater detail.

FIG. 4 shows the telephone locations T1, T2, and T3 of the 3 television conference subscriber stations with their subscriber circuits TS1, TS2 and TS3 and the conference signal receivers KSE1, KSE2 and KSE3, which are to be assigned to these television conference subscriber stations upon entry into the conference connection. The telephones and subscriber circuits are, of course, of conventional construction. The individual subscriber stations have access with their audio cables *a*1, *b*1 or *a*2, *b*2 or *a*3, *b*3 to a telephone exchange device S*p*V, also of known construction, over their subscriber circuits. An automatic subscriber station AT along with the identification device I*d* can be reached over the exchange S*p*V. Every conference signal receiver contains a relay (e.g., E1 in KSE1) which can be temporarily activated by the automatic subscriber station AT, a change-over relay (e.g., U1 in KSE1), as well as a double winding connecting relay (e.g., A1 in KSE1). The individual subscriber stations N1, N2 and N3 have access to the voice conference transmission network S*p*KU over the audio cable pairs *a*1'/*b*1', *a*2'/*b*2' and *a*3'/*b*3' containing the voice receivers S*p*E1, S*p*E2, S*p*E3.

In addition, FIG. 4 shows a coupling relay K1, K2 or K3 for each subscriber station, by means of the contact pairs of which 1*k*1, 2*k*2, 3*k*3, shown in FIG. 5, the video devices B1, B2, B3 of the individual subscriber stations can be coupled at the receivers and at the cameras to the video conference transmission network BKU.

Relays SP1, SP2 and SP3 shown in FIG. 4, which are controlled by the associated voice receivers and are assigned to individual subscriber stations, provide, by means of their change-over contacts 4*sp*1, 5*sp*1 or 6*sp*2, 7*sp*2 or 8*sp*3, 9*sp*3 in FIG. 5, for the normal conference through-switching of camera and receiver lines *m*1/*n*1, *m*2/*n*2 and *m*3/*n*3 in the video conference transmission network BKU, corresponding to the momentary state of the conference connection. That is, the participant, who is speaking, appears on the video receivers of all other conference participants as a single-picture.

FIG. 5 illustrates the structural details of video conference transmission network BKU, insofar as necessary to an understanding of the invention. FIG. 5 shows a single-picture line EBO connected in common to all video devices on which the picture of the conference participant who is speaking is available. Each video device has further, at its receiver, access to the combined picture line SB, on which the combined picture is transmitted by the combined picture camera SK (in FIG. 2) for the duration of the conference. On the further single-picture lines EB1, EB2 and EB3, which are connected to the individual conference subscriber stations, at their cameras for the entire duration of the conference, is the picture of the associated subscriber station, when that subscriber station is not in a speaking mode. The video conference transmission network is so built that the picture of the participant who is speaking, which is on the corresponding camera line *m*1 or *m*2 or *m*3, is connected to all video receivers of conference participants who are not speaking at the moment. This connection is made over the changeover contact 4*sp*1 or 6*sp*2 or 8*sp*3, which is in the operational setting, as well as over the common single-picture line EBO, and over the change-over contacts 5*sp*1, 7*sp*2 or 9*sp*3, which are at rest, and over the change-over contacts 10*s*, 11*s* or 12*s* of the relay S shown in FIG. 4. The relay S is attached to all conference subscriber stations in common and always responds when any participant is speaking. The participant who is speaking receives the combined picture coupled over the combined picture line SB, over his change-over contact 5*sp*1 or 7*sp*2 or 9*sp*3, which is in the operational setting. The combined picture is also received, in a pause in the conversation, by the television receivers of all conference participants over the change-over contact 10*s*, 11*s*, or 12*s*, which at this time has again dropped out.

In FIG. 5 a subscriber station is provided with a special authorization, insofar as it can receive at any time the picture of every other participant or also the combined picture, upon activating the keys TS, TB2 and TB3 lying in a row in its receiver video line *n*1.

In the following it is assumed that the participants at telephones T1 and T2 (in FIG. 4) are already connected to a conference. Their audio cables *a*1, *b*1 and *a*2, *b*2 were already switched over to the voice conference transmission network S*p*KU. The feeding of these two subscriber stations proceeds from the conference signal receivers KSE1 and KSE2, which are already attached to these subscriber stations. These two subscriber stations are designated as occupied in the telephone exchange device, for incoming conversation, since through the change-over relays U1 and U2 the loops of these subscriber stations to the telephone exchange device are maintained by inserting the resistors R1 and R2. The coupling relays K1 and K2 are excited over their change-over contacts 13*a*1 and 14*a*2 by the double-winding relays A1 and A2 lying in the connection thereto. Over the contact pairs 1*k*1 and 2*k*2 of relays K1 and K2, respectively, (in FIG. 5) the video lines of two video devices B1 and B2 are connected to the video conference transmission network BKU. For the case that neither of these two participants is speaking, both video devices B1 and B2 are connected at their receiver with their video lines *n*1 or *n*2 over the contacts 10*s* or 11*s*, which are at rest, at the combined picture line SB. The camera of video device B1 is connected to the picture line m1 over the change-over contact 4*sp*1, which is at rest, at the individual single-picture line EB1, and the camera of video device B2 is connected to the video line *m*2 over the changeover contact 6*sp*2, which is at rest, at the individual single picture line EB2.

If the subscriber at telephone location T3 wants to enter the conference connection, he dials the automatic subscriber station AT over the telephone exchange device SpV, by means of a special code number for conferences. If there is a positive identification result indicating authorization to participate in a conference, he may proceed to enter the conference connection. The newly entering participant is accorded a protective time before entering the conference so that he might inform himself as to the identities of the conference participants. This is accomplished by means of a reference picture. After this time, AT causes the relay E3 in the conference signal receiver KSE3 to respond briefly over contact 15*h*3. The relay U3 responds over contact 16*e*3, which by means of its contacts 17*u*3 and 18*u*3 switches over the audio cables *a*3, *b*3 of the telephone T3 to the voice conference transmission network SpKU over the cable pair *a*3'/*b*3', and by means of its contact 19*u*3 keeps the subscriber loop to the telephone exchange device closed by insertion of the resistor R3. With the take-over of the loop the double-winding relay A3 responds, and by means of its contact 20*a*3 maintains a holding circuit for the relay U3, even after relay E3 drops out. The coupling relay K3 is excited by contact 21*a*3, through whose contact pair 3*k*3 (in FIG. 5) the video device B3 of the newly entering subscriber station is connected to the picture conference transmission network BKU. The video device B3 has its camera connected over video line *m*3, closed contact 3*k*3 and contact 8*sp*3 at the common single-picture line EBO or at individual single-picture line EB3. The newly entering conference participant receives from the combined picture line SB a combined picture of the conference participants already present, over video line *n*3, closed contact 3*k*3, contact 12*s* and contact 9*sp*3, which is activated briefly upon entry.

As shown in FIG. 4, the relay E3 had caused the relay SP3 to close briefly over contacts 22*e*3 and 23*e*3, whereby the receiver video lines *n*1 and *n*2 of the video devices B1 and B2 were connected to the common single-picture line EBO over the contact 10*s* or 11*s* of the relay *s* which was switched on through contact 24*sp*3, independent of whether a participant already connected to the conference was speaking at that moment. In addition, common separation relay T, which had closed briefly over contact 25*e*3, interrupted the holding circuit of a just switched on relay SP1 or SP2 through opening its contact 26*t* and caused the corresponding relay to drop out. Through this switching function initiated by relay E3 it is insured that the picture of a newly entering conference participant appears preeminently on all screens of subscriber stations already in conference, for a short time, whereas the newly entering participant himself receives a combined picture.

However, if the newly entering conference participant extinguishes his connection with the automatic subscriber station AT during his protection or introduction time, then the automatic subscriber station is immediately switched free again, without giving an impulse to the relay E3.

In the further course of the conference, the through-switching of the video cables in the video conference transmission network is controlled by the voice receivers SpE1, SpE2 and SpE3, which are permanently attached to the individual subscriber stations for the duration of the conference. The voice receivers have a short rise time and a long fall time; the common coordination device AB in the known manner provides that at any one time only one voice receiver can respond (mutual response blocking). Therewith, the participant who is speaking at the moment enters the picture and is visible for all other participants until, after the fall time has expired, another participant picks up the conversation and enters the picture.

If the participant at telephone location T2 is speaking, then his video device B2 is connected at its camera with the common single-picture line EBO over the picture line *m*2 and the change-over contact 6*sp*2, and it is connected at its receiver with the combined picture line SB over the video line *n*2 and the change-over contacts 11*s* and 7*sp*2. This participant receives, therefore, the combined picture, whereas the two other participants at telephones T1 and T3 receive the picture of him who is speaking over the change-over contacts 5*sp*1 and 9*sp*3, which are at rest. The privileged participant at the video device B1 can now receive the picture of the participants at video device B3, by activating his key TB3, or he can receive combined picture through activating the key TS. If the participant at telephone T1 picks up the conversation after a pause in speaking of the participant at telephone T2, then the relay SP1 closes over voice receiver SpE1, contact 27*e*1, relay SP1, contact 28*e*1, diode D2, contact 29*g* and resistor R4. This occurs after relay SP2 drops out. After opening the contact 29*g* of the relay G, which is excited (with delayed closing) through contact 30*sp*1, the relay SP1 is maintained over the diode D1, contacts 31*sp*1, 32*sp*2, 33*sp*3 and 26*t* and resistor R4, until the end of the fall time of the voice receiver SpE1 or until a new conference participant enters the conference connection. In the latter case, as already described above, the relay SP1 drops out after opening of contact 26*t*, as does relay G. The individual relay "SP" of the newly entering conference participant can be held in a holding circuit running over the diode D4 or D6 and closed contact 29*g*, after drop out of the relay E, which responds only briefly, until the common separation relay T drops out.

The combined picture, which appears on the television receivers of all conference participants in the pauses in speech, as well as preeminently on the screen of a newly entering conference participant, is in addition visible preeminently on the screens of all conference participants, with a participant leaves the conference. If a participant leaves the conference, then, upon opening of the loops, the relays in the conference signal receiver assigned to him drop out. If, for example, the participant at telephone T2 exits from the conference, then the connecting relay A2 drops out. The contact 14$a$2 of relay A2 closes a charging circuit running over the diode D8 and the relay B for the capacitor C2. The common relay B receives excitation current when this circuit closes and attracts. The excited relay S drops out over the rest contact 34$b$, which opens. Relay B drops out again, and relay S can again close only when the charging current of the capacitor C2 is less than the holding current of relay B.

Although on the basis of maintenance of the loop in the telephone exchange device S$p$V a particular participant in the conference is busy, nevertheless, there exists the possibility for the operator to switch into an existing conference connection. In a manner not shown the operator can connect himself to the voice conference transmission network S$p$KU over his own conference signal receiver, from his site VP. The exchange site is equipped with a television camera FK, for the purpose of transmission of a reference picture to the video devices of all conference participants, which can be connected directly to the common combined picture line SB upon activation of a switching-on key TA. A relay not shown further, which is to be switched on by activating the key TA, separates the combined picture line SB from the combined picture emitter SBG by opening its rest contact 35$av$, and it prevents the excitation of the participant-common relay S by opening its rest contact 36$av$ and causes it to drop out as necessary. This insures that, independent of the momentary state of the conference hook-up, the video devices of all subscriber stations participating in the conference connection are connected to the common combined picture line SB for receiving the reference picture. This connection is made at the receivers over the change-over contacts 10$s$, 11$s$ and 12$s$ of the common relay, which are in the rest position, upon activating the switching-on key TA at the exchange VP.

Finally, it should be mentioned that the signals for the conference-type through-switching of the video cables in the video conference transmission network, instead of being obtained voice-controlled from voice-receivers which are to be attached to each subscriber station to participate in a conference connection could be obtained from other signals emitted directly at the individual subscriber stations themselves (e.g., activating a ground key).

The preferred embodiment of the invention described herein is only exemplary of the principles of the invention. Certainly, many modifications or changes will occur to one skilled in the art, which will be within the spirit and scope of the invention, as defined by the appended claims.

I claim:

1. In a telephone exchange system having video signal processing means, apparatus for completing a conference connection comprising:

- a plurality of subscriber stations interconnectable through said exchange, each subscriber station including a video device comprising a television receiver and a television camera,
- common single picture video line means connectable to said video devices in those of said subscriber stations participating in a conference connection,
- means for producing video signals corresponding to a simultaneously combined display of all the camera outputs from those of said subscriber stations participating in the conference connection,
- combined picture line means connectable to said producing means and to the video devices in said plurality of subscriber stations,
- video conference transmission network means for selectably connecting the video devices in those of said subscriber stations participating in the conference connection to said common line means and said combined picture line means, said receivers being connectable to said combined picture line means and said cameras and receivers being connectable to said common single picture line means,
- first switching means at said subscriber stations for selectably connecting said subscriber stations to said common and said combined picture line means and
- voice responsive second switching means for operating said transmission network connection means in dependence on which of said subscriber stations in the conference connection is transmitting audio signals.

2. The apparatus defined in claim 1 wherein said means for producing combined picture signals comprises:

- a plurality of television monitors,
- a plurality of monitor transmission lines connected to receive the camera outputs from said subscriber stations and connected to said television monitors,
- a switching matrix interposed in said monitor lines,
- a combined picture camera focused on said plurality of monitors, and
- monitor control means for operating said switching matrix for connecting predetermined ones of said monitor lines to selectable ones of said monitors and for regulating said combined picture signal to determine the spatial arrangement of the combined picture.

3. The apparatus defined in claim 2 wherein said switching matrix is interposed only in predetermined ones of said monitor lines, the others of said monitor lines being connected to cross-points of said matrix such that when said predetermined monitor lines receive signals from subscriber stations such signals may be switched said other monitor lines, as necessary.

4. The apparatus defined in claim 1 further comprising:

- a plurality of individual video lines individually connectable to the cameras in said video devices of those of said subscriber stations in the conference connection over said transmission network connection means and
- third manually operable switching means for selectively connecting the receivers in the video devices in said subscriber stations in the conference connection to any of said individual video lines or said combined picture line.

5. The apparatus defined in claim 1 wherein said video conference transmission network means is constructed to connect said receivers in those of said subscriber stations in the conference connection to said combined picture line means when said second switching means is inoperative as a result of an absence of audio transmissions.

6. The apparatus defined in claim 5 wherein said video conference transmission network includes means for operating upon exit of one of said subscriber stations from the conference connection to connect said receivers in the remaining subscriber stations to the combined picture line means.

7. The apparatus defined in claim 1 additionally comprising:

a further television camera in the exchange installation for transmitting a reference picture, said further camera having its output selectably connected to said combined picture line means and fifth switching means for connecting said further camera to said combined picture line means, for disconnecting said means for producing from said combined picture line means and for connecting the receivers in said subscriber stations to said combined picture line means thereby applying the picture from said further camera to each of said subscriber station receivers.

8. The apparatus defined in claim 3 wherein said first and second switching means are constructed so that said camera in said video device in the subscriber station of a speaking participant is connected to said common video line means, said camera therein being connected to said combined picture line means and so that said receivers in nonspeaking subscriber stations are connected to said common video line means, said cameras therein being individually connected to said individual video line means.

9. The apparatus defined in claim 4 wherein said video conference transmission network means is operable upon a pause in the voice signals from all of said subscriber stations to connect all of receivers in said stations to said combined picture line means.

* * * * *